United States Patent [19]

Zen

[11] 4,180,966
[45] Jan. 1, 1980

[54] DEVICE FOR REGULATING THE HEIGHT OF THE CUTTER PLATFORM OF COMBINE HARVESTERS

[75] Inventor: Marcello Zen, Breganze, Italy

[73] Assignee: Pietro Laverda S.p.A., Breganze, Italy

[21] Appl. No.: 946,919

[22] Filed: Sep. 28, 1978

[30] Foreign Application Priority Data

Oct. 17, 1977 [IT] Italy .............................. 53576/77[U]

[51] Int. Cl.² .......................................... A01D 67/00
[52] U.S. Cl. ...................................... 56/208; 56/10.2; 56/DIG. 15
[58] Field of Search ........................ 56/208, 10.2, 10.4, 56/DIG. 15

[56] References Cited

U.S. PATENT DOCUMENTS 3,461,655   8/1969   van der Lely .................. 56/208

Primary Examiner—Jay N. Eskovitz
Attorney, Agent, or Firm—Sughrue, Rothwell, Mion, Zinn and Macpeak

[57] ABSTRACT

Device for regulating the height of the cutter platform of a combine harvester by its automatic return to an adjustable, predetermined height after lowering by a jack includes a rod which slides freely downwards causing an abutment surface to compress a spring which reacts through a double arm lever to reset a distributor valve, causing the jack to raise the platform.

4 Claims, 3 Drawing Figures

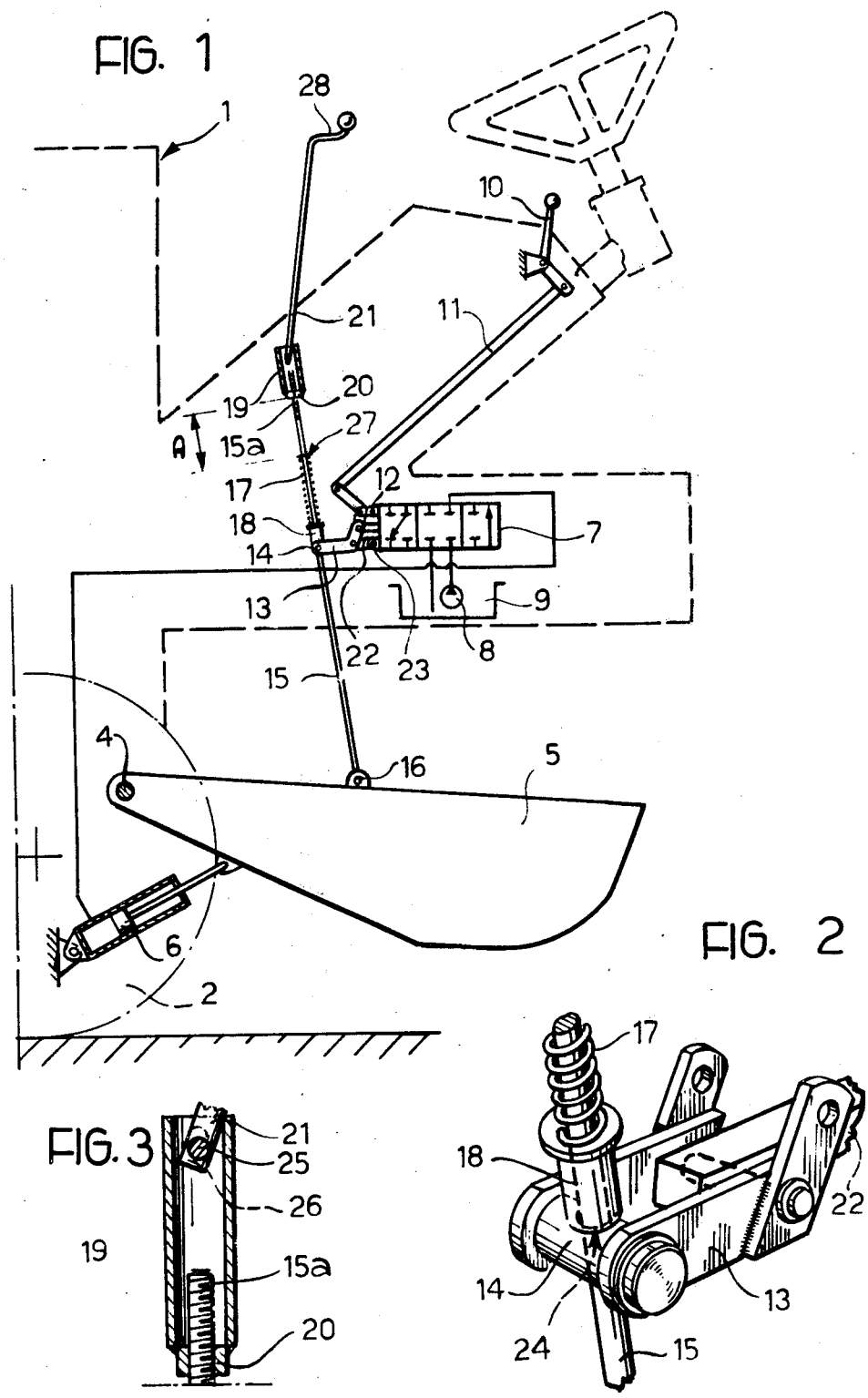

DEVICE FOR REGULATING THE HEIGHT OF THE CUTTER PLATFORM OF COMBINE HARVESTERS

The present invention relates to a device for regulating the height of the cutter platform of a combine harvester.

This invention relates in particular to devices for regulating the height of the cutter platform of a combine harvester, of the kind comprising at least one hydraulic jack for lifting and lowering a cutter platform, distributor valve means connected in the hydraulic circuit of said jack, manual control means acting on a movable member of the distributor means to control selectively the lifting and lowering of the cutter platform, and an automatic control device adapted to return the cutting platform automatically to an adjustable predetermined height when the manual control device is released from a position in which it caused lowering of the cutter platform below the predetermined height; the automatic control device including a control member connected to the cutting platform, and means controlling the distributor valve means in dependence upon the displacement of the control member.

Known devices of the above specified type are complex and costly to manufacture since the means for controlling the distributor valve in dependence upon the displacement of the control member consists of a large number of interconnected parts.

The object of the present invention is to provide a device of the above specified type with a reduced number of parts which is, consequently, simpler to manufacture, more economic and more reliable.

According to the present invention there is provided a device for regulating the height of the cutter platform of a combine harvester of the above specified type, characterised in that the means controlling the distributor valve means include: a resilient element having one end which acts on the movable member of the distributor means and an opposite end which reacts against an abutment surface of the control member, whereby when the platform is lowered by means of the manual control device to a height lower than the predetermined height the resilient element is stressed in a sense to return the movable member of the distributor valve means to a position corresponding to the predetermined height of the cutter platform when the manual control device is released, and means for varying the distance between the resilient element and the said abutment surface of the control member independently of the displacement of the platform.

The invention will now be described, by way of non-limiting example, with reference to the accompanying drawings, in which:

FIG. 1 is a schematic view of a device according to one embodiment of the invention;

FIG. 2 is an enlarged perspective view of a part of the device shown in FIG. 1, and FIG. 3 is an enlarged axial section of another part of the device shown in FIG. 1.

FIG. 1 illustrates diagrammatically part of the structure 1 of a combine harvester having front wheels 2.

A cutter platform 5 is pivoted to the structure 1 about a transverse, horizontal axis 4. The cutter platform 5 is supported by at least one single-acting hydraulic jack 6 which is part of an hydraulic circuit including a distributor 7, a pump 8 and a reservoir 9.

A manual control device in the form of a lever 10 is connected, through a lever transmission linkage 11, to a movable valve member 12 of the distributor 7. The movable distributor valve member 12 is pivotally connected to the free end of one arm of a double-arm lever 13 formed by two parallel plate-like elements interconnected by spacer pins (FIG. 2).

The two arms of the lever 13 are inclined at an angle to each other, the lever 13 being pivoted at the junction of the two lever arms to a link 22 which is pivoted to the body of the distributor 7 about a pivot axis 23. The plate-like elements of the other arm of the lever 13 are interconnected at the free end of said lever arm by a pivot pin 14 formed with a central transverse through bore 24. A rod 15 is freely slidable axially in the bore 24 in response to angular displacements of the platform 5, to which the rod is articulated at a pivot pin 16.

A helical compression spring 17 is slidably mounted on the rod 15 and acts at its lower end upon the pivot pin 14 through a spacer element 18. A washer 27, which is also slidable on the rod 15, rests upon the upper end of the spring 17.

The upper end 15a of the rod 15 is screw-threaded and is connected to a nut 20 which is welded to the lower end of a sleeve 19. The upper end of the sleeve 19 is articulated to a control rod 21 by means of a pivot pin 25, which is slidable within two longitudinally extending slots 26 (FIG. 3) formed diametrically opposite each other in the wall of the sleeve 19. The control rod 21 is provided with a handle 28 at its upper, free end.

The device operates as follows: the operator moves the control lever 10 which, through the transmission linkage 11, moves the valve member 12 of the distributor 7 to a position in which it connects the jack 6 either to the reservoir 9 or to the pump 8 to cause retraction or extension of the jack respectively so as to lower or lift the cutter platform 5, according to the direction of movement of the control lever 10. The movement of the cutter platform 5 causes axial sliding movement of the rod 15 in the transverse bore 24 in the pivot pin 14 of the lever 13, the displacement of the rod 15 being proportional to the height variation of the platform 5.

When the manual control lever 10 is moved in the sense to cause lifting of the cutter platform 5 the rod 15 slides freely upwards in the bore 24.

When the platform 5 is lowered below a predetermined height, which is adjustable in a manner described below, the rod 15 slides downwards in the bore 24, causing an abutment surface on the nut 20 to engage the washer 27, and so compress the spring 17. Consequently, when the manual control lever 10 is released the spring 17 causes the movable member 12 of the distributor 7 to return to a position which corresponds to the predetermined height of the cutter platform 5.

The predetermined height of the platform 5 is adjustable by turning the handle 28 on the control rod 21 to rotate the sleeve 19 and screw or unscrew the nut 20 on the rod 15. This varies the distance A between the nut 20 and the washer 27, predetermining the point at which the nut 20 begins to compress the spring 17 and thereby determining the height of the platform 5.

It will be understood that practical embodiments of the invention may be varied from that which has been described and illustrated, without departing from the scope of this invention.

What is claimed is:

1. Device for regulating the height of the cutter platform of a combine harvester, of the kind comprising:

at least one hydraulic jack for selectively lifting and lowering a cutter platform, a distributor valve having a movable member, said valve being connected in the hydraulic circuit of said jack to control the operation thereof, manual control means acting on said movable distributor valve member to control selectively the lifting and lowering of the cutter platform by the jack, an automatic control device adapted to return the cutter platform automatically to an adjustable predetermined height upon release of the manual control means from a position in which it caused lowering of the cutter platform below the predetermined height, said automatic control means including a control member connected to the cutter platform, and means controlling the distributor valve in dependence upon the displacement of the control member, wherein the improvement consists in:

the control member having an abutment surface and the said means controlling the distributor valve comprising:

a resilient element having one end which acts on the movable distributor valve member and an opposite end which reacts against said abutment surface of the control member, whereby when the platform is lowered under control of the manual control means to a height lower than the predetermined height the resilient element is stressed in a sense to return the movable member of the distributor valve to a position corresponding to the predetermined height of the cutter platform upon release of the manual control means, and means for varying the distance between the resilient element and the said abutment surface of the control member independently of the displacement of the platform.

2. Device as claimed in claim 1, wherein the control member comprises a substantially vertical rod pivotally connected to the cutter platform at one end and free to slide axially in response to a variation in the height of the platform, and wherein the resilient element is formed by a helical spring slidably mounted on the rod, the device further including connection means pivoted to the movable member of the distributor valve and acted upon by the lower end of the spring, the abutment surface of the rod which acts on the upper end of the spring being formed by a nut having a sleeve fixed thereto, the nut being threaded onto said rod, so that the effective length of the rod is adjustable by rotation of said nut.

3. Device as claimed in claim 2, wherein the connection means interposed between the lower end of the spring and the movable member of the distributor valve comprises a double arm lever, a link connected to a fixed pivot point and pivotally connected to a central pivot point of the lever, on arm of which is provided with a through bore in which the rod is freely slidable, and a spacer element engaged by the lower end of the spring, the other arm of the lever having a pivotal connection to the movable member of the distributor valve.

4. Device as claimed in claim 2 or claim 3, including a control rod having an articulated coupling to the sleeve for rotating the latter and said nut, and a handle attached to the free end of the control rod for rotating the latter.

* * * * *